United States Patent [19]

Kono et al.

[11] 4,328,678
[45] May 11, 1982

[54] REFRIGERANT COMPRESSOR PROTECTING DEVICE

[75] Inventors: Hiroya Kono; Jun Hasegawa, both of Kariya; Mitsukane Inagaki, Anjyo; Hisao Kobayashi, Kariya all of Japan

[73] Assignee: Kabushiki Kaisha Toyoda Jidoshokki Seisakusho, Aichi, Japan

[21] Appl. No.: 141,675

[22] Filed: Apr. 18, 1980

[30] Foreign Application Priority Data

Jun. 1, 1979 [JP] Japan .................... 54-69251

[51] Int. Cl.³ .................... F25B 49/00; G05D 23/32; F04B 49/10
[52] U.S. Cl. ..................... 62/126; 62/129; 62/158; 417/32
[58] Field of Search ............... 62/125, 126, 127, 129, 62/158; 417/32, 15, 63, 292

[56] References Cited

U.S. PATENT DOCUMENTS

| | | | |
|---|---|---|---|
| 2,447,894 | 8/1948 | Bauman | 62/127 X |
| 2,811,019 | 10/1957 | Courtney, Jr. | 417/32 |
| 3,232,519 | 1/1966 | Long | 417/32 X |
| 4,028,593 | 6/1977 | Newell | 62/158 X |
| 4,059,366 | 11/1977 | Gannaway | 417/32 |
| 4,167,858 | 9/1979 | Kojima et al. | 62/126 |

*Primary Examiner*—Albert J. Makay
*Assistant Examiner*—Harry Tanner
*Attorney, Agent, or Firm*—Browdy and Neimrk

[57] ABSTRACT

A protecting device for protecting a refrigerant compressor from overheating or seizure caused by a shortage of refrigerant by any chance such as leakage thereof. The device includes a temperature sensor disposed on the outer wall of the compressor casing in the vicinity of a refrigerant intake suction suction port for sensing the temperature of the outer wall to output the sensed or measured data and a discriminator for discriminating an occurrence of refrigerant shortage by an excess of the data over a predetermined condition for comparison. The signals from the discriminator cause a warning issuance of the refrigerant shortage or an automatic stoppage of the compressor operation.

12 Claims, 7 Drawing Figures

REFRIGERANT COMPRESSOR PROTECTING DEVICE

FIELD OF THE INVENTION

This invention relates to a protecting device for a compressor which compresses refrigerant enclosed in a refrigeration circuit, and more particularly to a protecting device capable of preventing an overheating or seizure of a refrigerant compressor, by means of detecting a possible shortage of refrigerant by measuring the temperature of an outer wall of casing of a refrigerant compressor in the vicinity of a refrigerant intake suction sucking port.

BACKGROUND OF THE INVENTION

In ordinary refrigerators, a refrigerant is repeatedly cycled alternately liquifying by condensation and gasifying by evaporation within a refrigeration circuit. A refrigerator will cool the surrounding area by removing heat therefrom when the refrigerant is gasified by evaporation. Refrigerators are commonly provided with a refrigerant compressor attached in the refrigeration circuit thereof, which compressor sucks the evaporated refrigerant for compressing the same before feeding it to a condenser.

If the refrigerant enclosed in the refrigeration circuit leaks by any chance outside the circuit to consequently reduce the amount of the refrigerant therein, there is a likelihood of taking place an overheating of the compressor due to deterioration of the cooling function thereof, and particularly in the event misty oil included in the refrigerant is expected to function as a lubricant the compressor will naturally be visited by a lubrication shortage through the refrigerant shortage, which often causes a seizure of the compressor.

It is therefore required to stop the operation of the compressor, in such a refrigerant leakage case down to a level below a certain predetermined limit, by means of sensing the amount of the refrigerant within the refrigeration circuit. Two ways of sensing such a refrigerant decrease (reduction) by a leakage have been known so far; one is to sense the refrigerant temperature, which is said to rise in response to the decrease of the refrigerant amount, and the other is to sense the temperature of the oil pan disposed in the bottom portion of the refrigerant compressor (hereinafter simply called a compressor) to detect the decrease of the refrigerant enclosed.

The two methods introduced above, i.e., variation of the refrigerant temperature or the oil pan temperature are not satisfactory in the capability of accurately responding to the decrease of the refrigerant. The seizure of the compressor has not been completely prevented due to the difficulty of accurately catching the information of the refrigerant reduction. Another disadvantage lies, in the refrigerant temperature measuring (sensing) method, in the difficulty of mounting the sensor within the structure of the compressor while severely keeping the gas-tightness between the two.

SUMMARY OF THE INVENTION

This invention was made from such a background, as a result of the studies and investigations, aiming at an object of providing a refrigerant compressor protecting device which is surely capable of preventing an overheating and/or seizure due to refrigerant shortage of the compressor by means of sensitively detecting or sensing the decrease of the refrigerant. The gist of this invention can be summarized as follows: in a compressor which is connected to a refrigeration circuit containing an enclosed refrigerant, a temperature sensor is attached on the outer wall of the compressor in the vicinity of the refrigerant intake suction port for the purpose of measuring the temperature of the outer wall itself; a discriminator is disposed for discriminating the refrigerant shortage by the information of rising of the output from the temperature sensor having exceeded a predetermined condition; and a warning for the refrigerant shortage and/or a halting (automatic turning off) of the compressor is carried out, owing to the output of the refrigerant shortage signal from the discriminator, to effectively prevent the seizure of the compressor. Incidentally the wording "the outer wall" is used in a broad sense to include not only the outer wall of the casing itself but also other fixedly attached portions, such as flanges, covers, etc., to the outer wall.

Although it is generally regarded as appropriate that the temperature rising due to refrigerant shortage is most remarkable in the neighborhood of the refrigerant sucking port, regardless of type and size of the compressors, the degree of the sensitivity according to the area to the decrease of refrigerant is not universally constant but largely depends upon type and size of the compressors. So it is very hard to decide uniformly or indiscriminately the area where the temperature sensor should be disposed. Expressing it conceptionally or qualitatively, it can be said to be an area within which the temperature variation in response to the decrease of the refrigerant can be detected with sufficient accuracy, even under a full consideration of the degree of load, influence from the environmental temperature fructuation, and error of the temperature sensor and discriminator circuit; but if it should be expressed quantitatively or numerically, it may be defined as an area within a circle of the radius 4D from the center of the refrigerant sucking port, wherein D designates the diameter of the refrigerant sucking port.

DETAILED DESCRIPTION OF THE PREFERRED EMBODIMENTS

Before entering the detailed description of the embodiments with reference to the appended drawings, some actual experiments which the inventors of this invention carried out and the fundamental principles around this invention in relation to the experiments will be disclosed for better understanding of the embodiments.

The inventors of this invention have found a phenomenon, after a series of strenuous experiments and studies for eliminating the conventional disadvantages, that the temperature on the outer wall of the compressor in the neighborhood of the refrigerant sucking port sensitively varies in response to the decrease of the refrigerant amount.

Figure 1:
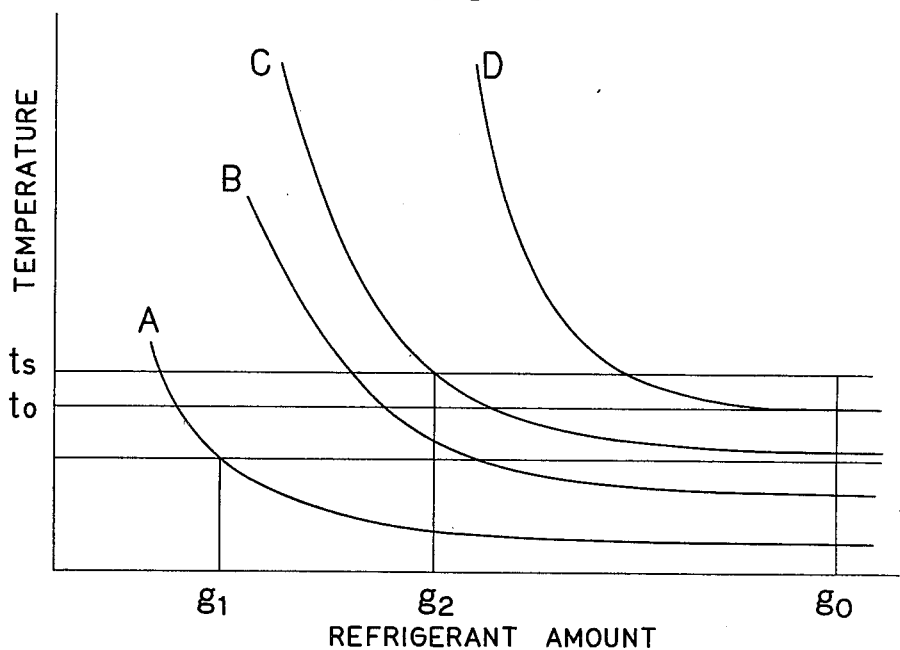
FIG. 1 is a graph showing the relation between the amount of the refrigerant and the temperature of the refrigerant and of the outer wall in the vicinity of the refrigerant sucking port.

For example in FIG. 1, which is a graph for showing the temperature variation of a compressor of swash-plate type used for a car air-conditioning in a comparison between the variation of the temperature of the outer wall of the compressor casing (C and D in the graph) in the vicinity of the refrigerant sucking port and the variation of the temperature of the refrigerant (A and B in the graph) at the refrigerant sucking port, the former is more sensitive than the latter in responding to the decrease of the refrigerant, in any case regardless of greatness (B and D in the graph) and smallness (A and C in the graph) of the refrigerating load.

Figure 2:
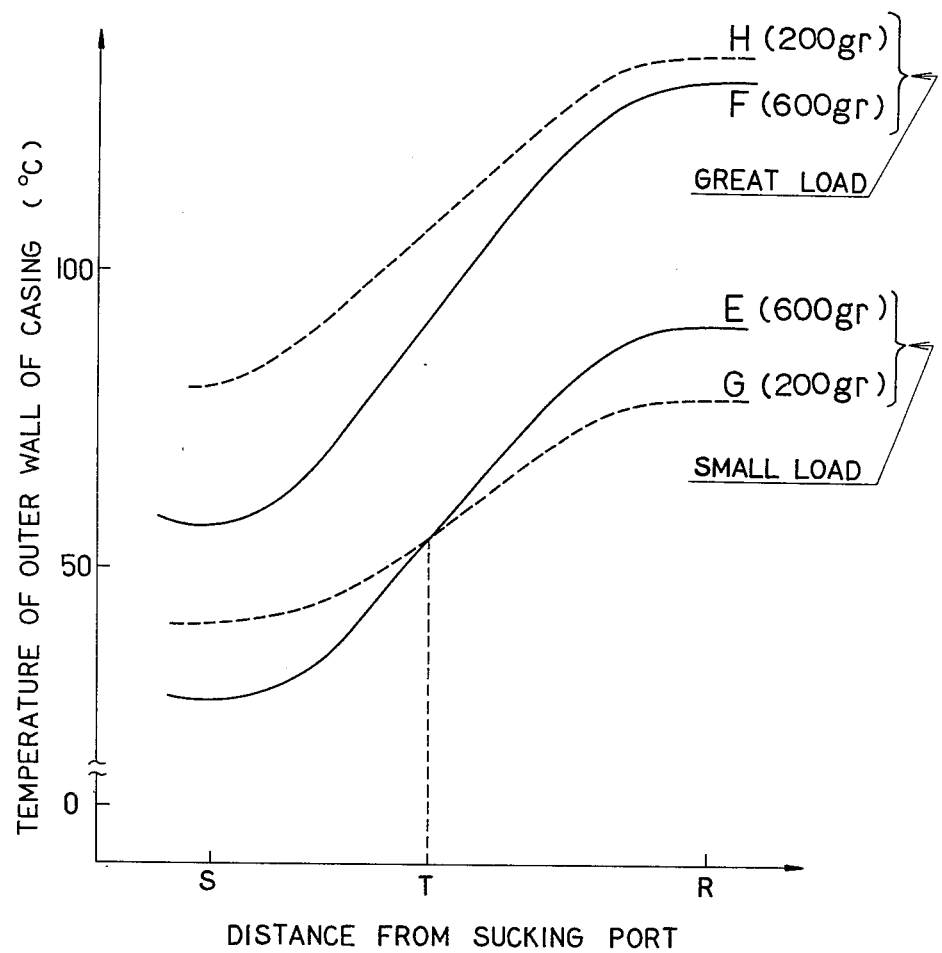
FIG. 2 is a graph showing the relation between the temperature of the outer wall of the compressor and the distance from the refrigerant sucking port.

Another discovery is a gradual degradation of the responding capability of the temperature of the outer wall to the decrease of the refrigerant amount as the temperature measuring point is distanced from the refrigerant sucking port and approached to the refrigerant discharging port. FIG. 2 shows an example of a compressor of swash-plate type used for a car air-conditioning, wherein the relation between the distance from the refrigerant sucking port and the temperature of the outer wall of the compressor casing is observed. E and F shown in solid lines are for representing cases wherein the refrigerant amount is normal (600 g). G and H in broken lines are for representing cases of refrigerant shortage (200 g). Further E and G show the temperature variation when the refrigerating load is small and F and H show the temperature variation when the refrigerating load is great. S on the abscissa designates the center of the sucking port and R the center of the discharging port. What is clearly observed from the graph is the greatest sensitivity of the temperature variation to the decrease of the refrigerant amount can be located in the neighborhood of the refrigerant sucking port, regardless of the magnitude of load, and the sensitivity is degraded as the measuring point is distanced from the refrigerant sucking port. Especially when the refrigerating load is small: (1) the temperature of the outer wall of the casing in the neighborhood of the refrigerant sucking port is, in case of refrigerant shortage condition, lower in comparison to a case of the normal refrigerant volume condition; (2) the difference of the temperatures of the outer wall of the casing between either instances becomes smaller as the temperature measuring point becomes farther from the refrigerant sucking port; and (3) eventually the temperature in the former instance, refrigerant shortage condition, becomes contrarily higher than in the latter instance, normal refrigerant volume condition, when the temperature measuring point is separated farther from the refrigerant sucking port exceeding the T point.

With reference to the appended drawings, preferred embodiments of a protecting device in accordance with this invention which were applied on a swash-plate type compressor will be described in greater detail based on the experimental data above-mentioned.

Figure 3:
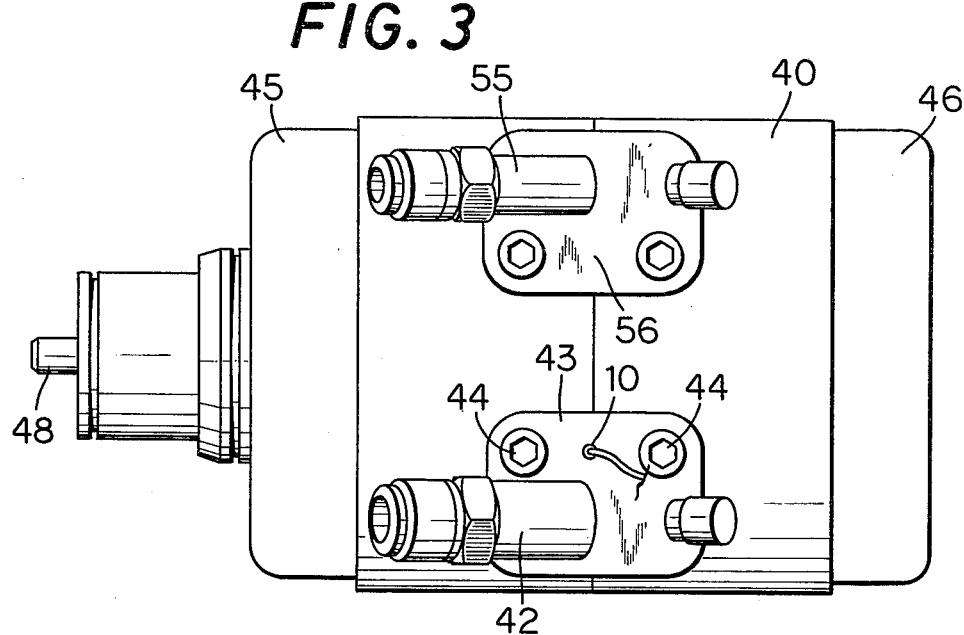
FIG. 3 is a plan view of a refrigerant compressor containing an embodiment of this invention.
Figure 4:
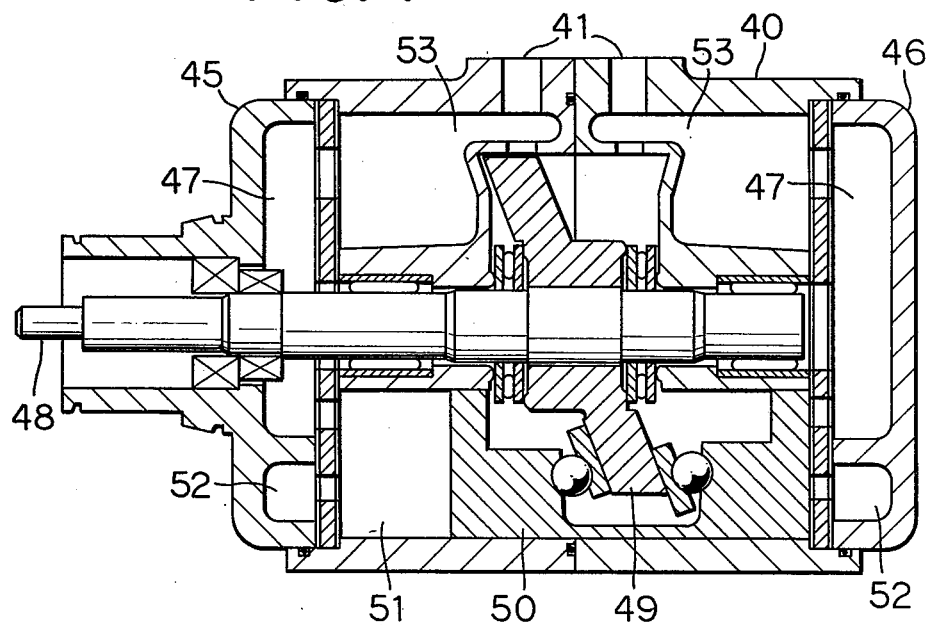
FIG. 4 is an axial section of the main body of the compressor shown in FIG. 3.

In FIG. 3 numeral 40 designates a gas-tightly sealed casing of a compressor. The casing 40 is provided with a refrigerant sucking port 41 on top thereof, which is located almost in the middle of the casing taken in the longitudinal direction thereof but biased on one side of the axis. To this refrigerant sucking port or inlet (hereinafter simply called a sucking port) a suction pipe 42 is fixedly attached by means of a flange 43 integrally formed therewith, which is secured to the casing 40 with a bolt 44. The suction pipe 42 which is connected to a refrigeration circuit functions to introduce the refrigerant in the passage into the compressor. The refrigerant sucked into the compressor through the suction pipe 42 is introduced, via a suction passage 53 formed in the casing 40, into suction chambers 47 which are disposed in a front housing 45 and a rear housing 46. The refrigerant sucked in the suction chambers 47 is compressed, after having been sucked into a cylinder bore 51 by a piston 50 which is reciprocated by a swash-plate 49 rotatable with a shaft 48, followed by a discharge into discharging chambers 52 which are similarly disposed in the front housing 45 and the rear housing 46. The refrigerant in the discharging chambers 52 is flowed through a discharge passage piercing through the casing 40 to a refrigerant discharging port or outlet (hereinafter simply called a discharging port). The discharging port is located, symmetrically with the sucking port 41 in relation to the axis of the casing 40, on the top of the casing 40. A discharge pipe 55 is fixedly attached to the casing 40 by means of a flange 56 integrally formed therewith.

Figure 5:
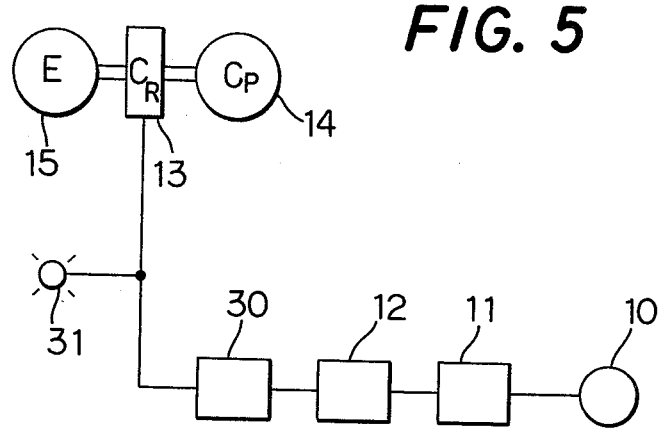
FIG. 5 is a diagram of an embodiment of a refrigerant compressor protecting device of this invention.

On the flange 43 of the suction pipe 42 a sensor 10 for sensing temperature is attached, which is connected to a controlling system composed of a thermometer circuit 11, a discriminator 12, a delay circuit 30, and a clutch mechanism 13 as shown on the diagram of FIG. 5.

Output signal from the sensor 10 is amplified at the thermometer circuit 11 before being delivered to the discriminator 12, which will output a signal informing that the refrigerant is in shortage, when it discriminates, in a comparison of the temperature t of the outer wall of the casing 40 and a preset temperature $t_s$, an excess of the former over the latter. Due to this signal of refrigerant shortage the clutch mechanism 13 will be disconnected to make an engine 15 or an electric motor as a driving source to be disconnected from a compressor 14 for stopping the same. This refrigerant shortage signal is also sent to an warning lamp 31 in order to give a warning to the driver, by the lightening of the lamp, of the operation stoppage of the compressor due to the refrigerant shortage.

The preset temperature value $t_s$ is determined, as shown in FIG. 1, based on a curve D in FIG. 1 indicating the relation of the refrigerant amount—outer wall temperature in a case of large refrigerating load where a high temperature level is observed. It means that the preset temperature value has a plenty of allowance so that the controlling system may not misoperate in response to the temperature $t_o$ of the outer wall corresponding to the normal refrigerant amount $g_o$.

Figure 6:
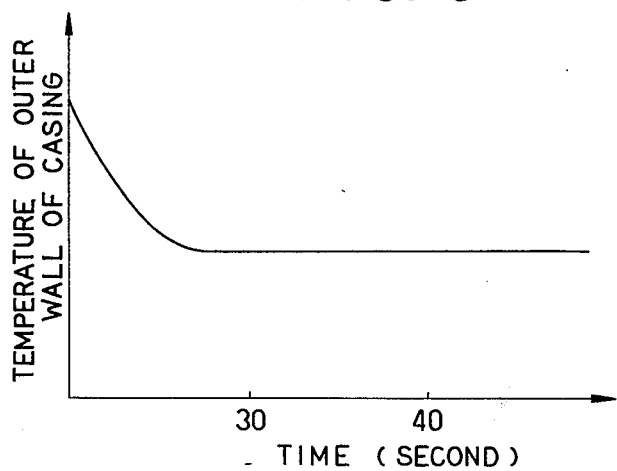
FIG. 6 is a graph showing the temperature of the outer wall of the compressor in relation to the time lapsing.

The delay circuit 30 is disposed for preventing the temperature of the outer wall which has been risen as high as or above the atmospheric temperature while the compressor was in stoppage from actuating the protecting device, during the time from the starting of the compressor to the stationary or normal state thereof, to stop the compressor. The delayed time in this case is set at 30 seconds based on the curve, shown in FIG. 6, of the outer wall temperature—time relation. As the delay circuit mentioned above a C-R timer, for example, may be utilized, which is a combination of a capacitor and a resistor.

In a refrigerant compressor protecting device of such a structure, the temperature of the outer wall in the vicinity of the sucking port is sensed by the sensor 10, and the compressor 14 is automatically stopped of its operation at the time when the refrigerant amount has decreased down to $g_2$, even in a case wherein the refrigerating load is small (C in FIG. 1), which shows the worst respondability to the refrigerant decreasing, because the critical temperature is set at $t_s$.

In another example observed, in comparison, for showing the sensing capability to the refrigerant decrease wherein the temperature is set in a similar way based on the refrigerant temperature curves A and B in FIG. 1, the resulting sensing capability of refrigerant amount is $g_1$. It eloquently proves the remarkable superiority of the refrigerant amount sensing capability $g_2$ in this method of temperature sensing at the outer wall in the vicinity of the sucking port.

The above-mentioned value $g_2$ corresponding to the worst respondability is as low as less than one half of $g_0$ in the normal refrigerant amount. The compressor can not be visited by a seizure in such a level of the refrigerant. The above-mentioned embodiment of this invention is able to effectively prevent the seizure accident, unlike the conventional ones, regardless of the magnitude of the refrigerating load.

Figure 7:
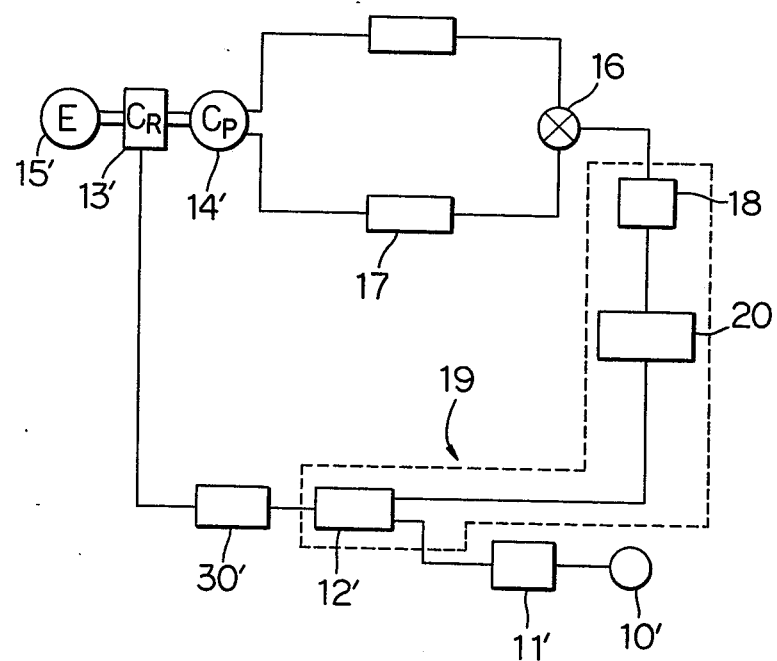
FIG. 7 is a diagram of another embodiment of a refrigerant compressor protecting device of this invention.

FIG. 7 is a diagram of another embodiment wherein the set temperature is varied according to the magnitude of the refrigerating load, so that the operation of the compressor may be stopped more accurately. Numeral 16 in this figure designates an expansion valve, the opening and closing of which is regulated in response to the magnitude of the refrigerating load which is variable according to the temperature fluctation in the surrounding area of an evaporator 17. So the variation of the refrigerating load can be detected by sensing the degree of opening of the expansion valve 16 by a sensor 18, and the resulting information is sent to a calculating circuit 20. This calculating circuit 20 is so constructed as to calculate the temperature of the outer wall from a formula $t_s' = ax + b$, wherein x designates refrigerating load and a and b respectively designate a constant, which is an equation approximating the relation between the outer wall temperature and the refrigerating load at the refrigerant amount at which the compressor is desired to stop, for outputting the set temperature of the outer wall $t_s'$, corresponding to the varying refrigerating load, toward a comparator 12'. The comparator 12' compares the outer wall temperature $t_s'$ calculated in the calculating circuit 20 and the outer wall temperature actually measured by the sensor 10' and the thermometer circuit 11', for outputting a refrigerant shortage signal, when the measured temperature exceeds the calculated temperature, in order to disconnect a clutch mechanism 13'. In other words, a discriminator 19 is in this embodiment composed of the sensor 18, the calculating circuit 20, and the comparator 12'. Numeral 30' designates a delay circuit which is similar to the delay circuit 30 in the previous embodiment.

This embodiment is more advantageous in its capability of eliminating the influence of the refrigerating load given to the outer wall temperature because of an automatic temperature setting according to the magnitude of the refrigerating load, and of more accurately sensing the refrigerant shortage for stopping the compressor operation.

Besides, when the compressor is utilized for a refrigerator or an air-conditioner which is driven by an electric motor, it can be stopped of its operation through a stoppage of the electric motor by an electric signal from the discriminators 12, 19.

As detailed in the above the refrigerant compressor protecting device of this invention is highly meritorious in its capability of sensitively sensing the decrease of the refrigerant owing to the measurement of the temperature of the outer wall of the compressor casing in the vicinity of the sucking port and of thereby automatically stopping the drive of the compressor and/or of giving a warning when the refrigerant is decreased down to a level below a set value. Another merit of this invention lies in having completely eliminated the problem of sealing by selecting the mounting place of a temperature sensor at the preferable outer wall of the compressor.

What is claimed is:

1. A protecting device for protecting a refrigerant compressor which is connected to a refrigeration circuit containing a refrigerant enclosed therein from overheating problems resulting from a shortage of the refrigerant in the refrigeration circuit, said protecting device comprising;
    a temperature sensor for sensing the temperature of an outer wall of said compressor in the vicinity of a refrigerant intake suction port and providing an output signal representative of the sensed temperature value;
    a discriminator for detecting a shortage of the refrigerant by detecting a temperature value in the output from said temperature sensor which is greater than a set value, and emitting a refrigerant shortage signal when such a shortage is detected; and
    protection means for taking action necessary to protect said compressor against such overheating problems resulting from such refrigerant shortage, in response to the signal emitted from said discriminator.

2. A protecting device claimed in claim 1, wherein said protection means is a warning lamp to give an operator a warning of the refrigerant shortage when the the lamp is energized by the signal emitted from said discriminator.

3. A protecting device claimed in claim 1, wherein said protection means is a means for automatically stopping the operation of said compressor.

4. A protecting device claimed in claim 3, wherein said compressor is driven, via a clutch, by an engine of a vehicle and said clutch functions as said protection means by disconnecting said compressor from said engine.

5. A protecting device claimed in claim 3, wherein said compressor is driven by an electric motor and said protection means is means for interrupting power to said electric motor.

6. A protecting device claimed in claim 1, further comprising a delay circuit for delaying the signal from said discriminator by a predetermined time duration which is required from the starting of said compressor to the moment when the temperature of said outer wall of the casing, to which said temperature sensor is attached, is able to come down from a value exceeding said set value of substantially stationary value, whereby said protection means will not become activated immediately after starting of the compressor in spite of sufficient amount of refrigerant being present in said refrigeration circuit.

7. A protecting device claimed in claim 1, wherein said set value is predetermined fixedly and commonly with respect to the magnitude of the refrigerating load applied to said refrigerating circuit.

8. A protecting device claimed in claim 1, wherein said discriminator comprises:
load sensing means for sensing the refrigerating load to said refrigerating circuit;
calculating means for calculating said set value from an equation which represents the relation between a refrigerating load, at the time when the amount of the refrigerant is at the critical level at which the compressor is desired to be stopped, and a temperature of the outer wall of the casing at a position where said temperature sensor is attached; and
a comparator for comparing said set value and the temperature measured by said temperature sensor and emitting the refrigerant shortage signal when the measured temperature exceeds said set value.

9. A protecting device claimed in claim 8, wherein said load sensing means is a sensor for sensing the degree of opening of an expansion valve in said refrigerating circuit.

10. A protecting device claimed in claim 1, wherein said compressor is a swash-plate type compressor which comprises a casing having said outer wall, a plurality of pistons reciprocatively disposed in said casing and a rotating swash-plate for actuating said pistons, and said refrigerant intake suction port is disposed on the top of said casing symmetrically with a refrigerant discharging port in relation to the axis of said casing.

11. A protecting device claimed in claim 1, wherein said temperature sensor is located at an area within a circle of radius 4D from the center of said refrigerant intake suction port, D being the diameter of said intake suction port.

12. A protecting device claimed in claim 11, wherein said temperature sensor is attached to a flange of a suction pipe fixed to said casing in the vicinity of said refrigerant intake suction port.

* * * * *